United States Patent
Butwell et al.

(10) Patent No.: US 6,521,020 B2
(45) Date of Patent: Feb. 18, 2003

(54) CLAUS FEED GAS HYDROCARBON REMOVAL

(75) Inventors: Kenneth F. Butwell, Newburgh, NY (US); William B. Dolan, Yardley, PA (US); Steven M. Kuznicki, Whitehouse Station, NJ (US)

(73) Assignee: Engelhard Corporation, Iselin, NJ (US)

(*) Notice: Subject to any disclaimer, the term of this patent is extended or adjusted under 35 U.S.C. 154(b) by 0 days.

(21) Appl. No.: 10/096,908

(22) Filed: Mar. 14, 2002

(65) Prior Publication Data

US 2002/0134241 A1 Sep. 26, 2002

Related U.S. Application Data

(62) Division of application No. 09/602,945, filed on Jun. 26, 2000, now Pat. No. 6,387,159.

(51) Int. Cl.[7] .......................... B01D 53/04; B01D 53/06; B01D 53/52
(52) U.S. Cl. ................ 95/99; 95/106; 95/123; 95/143; 95/235; 95/236; 423/228; 423/567.1
(58) Field of Search ................ 95/99, 106, 117, 95/120, 123, 143, 144, 235, 236, 902; 423/228, 229, 567.1

(56) References Cited

U.S. PATENT DOCUMENTS

| | | | |
|---|---|---|---|
| 2,834,430 A | 5/1958 | Johnson | |
| 4,553,984 A | 11/1985 | Volkamer et al. | 55/46 |
| 4,853,202 A | 8/1989 | Kuznicki | 423/326 |
| 4,938,939 A | 7/1990 | Kuznicki | 423/326 |
| 5,244,650 A | 9/1993 | Kuznicki et al. | 423/718 |
| 5,318,758 A | 6/1994 | Fujii et al. | 423/228 |
| 5,346,535 A | 9/1994 | Kuznicki et al. | 95/96 |
| 5,681,369 A | 10/1997 | Osborne | 95/93 |
| 5,858,068 A | 1/1999 | Lansbarkis et al. | 95/116 |
| 5,861,051 A | 1/1999 | Critchfield et al. | 95/172 |
| 6,001,320 A | 12/1999 | Addiego | 423/239.2 |
| 6,068,682 A | 5/2000 | Kuznicki et al. | 95/130 |
| 6,074,459 A | 6/2000 | Gingrich et al. | 95/118 |
| 6,099,619 A | 8/2000 | Lansbarkis et al. | 95/118 |
| 6,120,581 A | 9/2000 | Markovs et al. | 95/99 |
| 6,152,990 A | 11/2000 | Allen et al. | 95/90 |
| 6,287,365 B1 | 9/2001 | Markovs et al. | 95/96 |
| 6,387,159 B1 * | 5/2002 | Butwell et al. | 95/99 |

* cited by examiner

Primary Examiner—Robert H. Spitzer
(74) Attorney, Agent, or Firm—Russell G. Lindenfeldar

(57) ABSTRACT

A process for adsorbing hydrocarbons from an acid gas stream includes passing the acid gas stream through an adsorbent which selectively removes hydrocarbons, desorbing the hydrocarbons from the adsorbent and contacting the desorbed hydrocarbons with an acid gas removal solution to remove acid gases which have been coadsorbed with the hydrocarbons. The process is particularly useful in removing hydrocarbons from a hydrogen sulfide-containing stream which is being directed to Claus processing for conversion into elemental sulfur. Useful adsorbents include crystalline titanium silicate molecular sieves containing titania octahedral sites such as ETS-10 and similar materials, as well as high silica aluminosilicate zeolite.

10 Claims, 3 Drawing Sheets

CLAUS FEED GAS HYDROCARBON REMOVAL

This application is a division of U.S. Ser. No. 09/602,945 filed Jun. 26, 2000, now U.S. Pat. No. 6,387,159, issued May 14, 2002.

FIELD OF THE INVENTION

This invention relates to a novel integrated process for removing hydrocarbon and other organic contamination from feed gas streams for Claus reactors. This invention also relates to the use of unique inorganic molecular sieves of the type containing octahedral coordinated metal sites, such as coordinated octahedral titanium, in processes for removing hydrocarbon and other organic contamination from hydrogen sulfide-containing streams.

BACKGROUND OF THE INVENTION

Natural gas as well as refinery gas streams are commonly contaminated with sulfur compounds, especially hydrogen sulfide ($H_2S$). If substantial amounts of hydrogen sulfide are present, regulatory restrictions dictate special precautions must be taken to purify the gas streams. In non-polluted areas, generally a maximum of two tons per day of sulfur are allowed to be vented as sulfur oxide ($SO_2$) flare-off gas per processing plant. In populated areas even more stringent restrictions are applied.

The first step in $H_2S$ removal from natural gas and/or refinery streams is accomplished by an acid gas removal unit. This unit removes substantial amounts of $H_2S$ and $CO_2$ from the processing stream. The off-gas of this stream contains predominantly $CO_2$ and $H_2S$. The sulfur from this off-gas stream is removed by the Claus reaction which produces salable elemental sulfur. The remaining $CO_2$ may be safely vented to the atmosphere.

The Claus process was discovered over 115 years ago and has been employed by the natural gas and refinery industries to recover elemental sulfur from hydrogen sulfide-containing gas streams for the past 50 years. Briefly, the Claus process for producing elemental sulfur comprises two major sections. The first section is a thermal section where $H_2S$ is converted to elemental sulfur at approximately 1,800–2,200° F. No catalyst is present in the thermal section. The second section is a catalytic section where elemental sulfur is produced at temperatures between 400–650° F. over an alumina catalyst. The reaction to produce elemental sulfur is an equilibrium reaction, hence, there are several stages in the Claus process where separations are made in an effort to enhance the overall conversion of $H_2S$ to elemental sulfur. Each stage involves heating, reacting, cooling and separation. A flow diagram of the Claus process is shown in FIG. 1 which will be explained in more detail below.

In the thermal section of the conventional Claus plant, a stoichiometric amount of air is added to the furnace to oxidize approximately one-third of the $H_2S$ to $SO_2$ and also burn all the hydrocarbons and any ammonia ($NH_3$) present in the feed stream. The primary oxidation reaction is shown as follows:

$$2H_2S + 3O_2 \rightarrow 2SO_2 + 2H_2O \tag{1}$$

This reaction is highly exothermic and not limited by equilibrium. In the reaction furnace, the unconverted $H_2S$ reacts with the $SO_2$ to form elemental sulfur. This reaction is shown as follows:

$$2H_2S + SO_2 \leftrightharpoons 3S° + 2H_2O \tag{2}$$

Reaction (2) is endothermic and is limited by equilibrium.

In the catalytic section of the Claus process, the unconverted hydrogen sulfide and sulfur dioxide from the thermal stage are converted to sulfur by the Claus reaction (2) over an alumina catalyst. Typically, there are three stages of catalytic conversions. Important features of the Claus reaction in the catalytic stage are that the reaction is equilibrium limited and that the equilibrium to elemental sulfur is favored at lower temperatures.

The Claus process was modified in 1938 by I.G. Fabenindustrie and various schemes of the modified process are utilized today. For feed gas streams containing approximately 40% $H_2S$, the balance carbon dioxide ($CO_2$) and water ($H_2O$), the once through Claus process is generally employed in which all of the acid gas is fed directly to the burner. Three catalytic stages are typically utilized after the initial thermal stage. This scheme will generally produce an overall recovery of 95–97% sulfur. If this recovery efficiency is acceptable, no further processing is required. However, if the recovery efficiency is not high enough (for a variety of reasons and, in particular, environmental constraints) an advanced Claus process such as Comprimo's Super Claus process which has a sulfur efficiency of 99.0% can be utilized. This process consists of the replacement of the final Claus reaction stage by, or the addition of, a reaction stage featuring a proprietary catalyst to promote the direct oxidation of hydrogen sulfide to sulfur selectively in the Claus tail-gas. Air is injected upstream of the reactor. The hydrogen sulfide and oxygen react over the catalyst via the following reaction:

$$2H_2S + O_2 \rightarrow 2S° + 2H_2O \tag{3}$$

If a sulfur recovery efficiency of greater than 99% is required, a tail-gas cleanup unit (TGCU) needs to be employed. This type of unit allows for an overall sulfur recovery efficiency of 99.8%. In the United States, a sulfur recovery efficiency of 99.8+% is required for Claus production units generating greater than or equal to 50 STSD of elemental sulfur, hence, a TGCU such as the Shell Scot process is often required. Such processes coupled with a sulfur recovery unit (SRU) can meet and exceed a sulfur recovery efficiency of 99.8+%.

There are other modifications to the basic Claus process. One particular modification to the Claus process that is widely used today is the "Split-Flow" process for feed gas streams containing 30–35% $H_2S$ or less concentrations. In this scheme, 40–60% of the feed gas is passed directly to the catalytic section, bypassing the noncatalytic reaction furnace. This process is utilized to achieve a hotter temperature and a more stable flame in the furnace. The bypassed feed joins the furnace effluent after the condenser and the combined flow enters the first catalytic converter. The sulfur recovery efficiency for this scheme is normally 1–3% lower than the conventional once-through or straight-through process. Basic descriptions of Claus process schemes and additional tail-gas cleanup units are given in the *Kirk Othmer Encyclopedia of Chemical Technology*, Vol. 23, pp. 440–446, the contents of which are incorporated herein by reference.

In the Claus reaction scheme, it can be seen that combustion air is a critical variable in maintaining a high efficiency operation in the thermal section. Hydrocarbon impurities and other feed gas contaminants not only cause a high temperature operation (up to 2,500° F.) such contaminants cause problems in maintaining the correct amount of combustion air. Additionally, it should be noted that in the first catalytic stage, any carbonyl sulfide (COS) and carbon disulfide ($CS_2$) that are formed in the reaction furnace and/or any such materials entering the catalytic section with the feed gas such as in the split flow process must be hydrolyzed to hydrogen sulfide and $CO_2$ if they are to be removed. Any sulfur in the form of COS or $CS_2$ leaving the first catalytic stage cannot be recovered by the Claus process because of the lower temperatures used in the second and subsequent catalytic stages. A bottom bed temperature of 600–640° F. is required in the first catalytic stage for good hydrolysis which in turn requires an inlet bed temperature greater than 500° C. Normal operation for the inlet bed temperature is generally 450–460° F., hence the higher temperature for the former does not favor the equilibrium to elemental sulfur formation.

In the Claus process design and operation to date, it is the design and operation of the reaction furnace, reaction furnace burner and the first catalytic converter or stage which are critical in an effort to achieve a successful operation. The burner is a critical piece of equipment in that it must be able to burn one-third of the incoming $H_2S$ while also burning all the impurities in the feed gas stream, namely, paraffin and aromatic hydrocarbons, ammonia and low molecular weight organics at substoichiometric air conditions. This is critical not only to the Claus unit where oxygen ($O_2$) is detrimental to the alumina catalysts but also to the tail-gas cleanup units where a reducing condition is employed at the front end of the unit. In the design of the reaction furnace burner, there has been considerable discussion as to the type of burner to be utilized based solely on economics. More complex and expensive burners can handle moderately higher concentrations of hydrocarbon impurities and even higher molecular weight hydrocarbons, up to 1% propane. However, burner design, no matter how expensive, only addresses coping with the impurity and not solving the problem. In fact, the burner does not combust the lighter hydrocarbons, but the combustion products are mostly $CS_2$ and $CO_2$ and these compounds create additional problems that must be addressed. Also, when hydrocarbons are combusted, additional air is fed and $CO_2$ and $H_2O$ are generated which adds to the volumetric flow which in turn requires larger equipment for a given sulfur production rate. Another problem is the fact that even the most expensive burner design cannot handle $C_4$+aliphatic hydrocarbons and all aromatic hydrocarbons. These materials can generate soot or polymeric hydrocarbons which can coat the reaction furnace and the first catalytic converter catalyst.

There are other problems associated with the presence of hydrocarbons in the Claus feed stream and consequent generation of $CS_2$. The reaction of the hydrocarbons with $H_2S$ and $O_2$ are endothermic in a furnace where an exothermic condition is required to generate a sufficient high temperature for their destruction. Additionally, in the first catalytic converter, any $CS_2$ that is not hydrolyzed goes through the remaining part of the Claus unit as $CS_2$ and presents a loss in sulfur recovery efficiency and a potential explosive hazard. As a case in point, the addition of 2% light hydrocarbon as methane ($CH_4$) and ethane ($C_2H_6$) and 1.5% $C_6$+in the Claus feed results in a capital increase for the Claus plant of approximately 33%. Additionally, and also very important, the emissions as $SO_2$ and $CO_2$ increase by 25%.

It can be seen that hydrocarbon and other organic contamination of feed gas streams for Claus reactors, common in natural gas purification as well as in oil refinery processing, cause substantial processing problems. In addition to deactivating the Claus catalyst, organic species, when combined with sulfur, form a wide range of undesirable compounds. Many of these compounds are toxic and subject to strict regulatory restrictions. These regulations are driving efforts to identify appropriate means to remove the hydrocarbon and other organic contaminants before they reach the Claus reactor.

Adsorptive solutions to this hydrocarbon and organic contamination problem currently center on the use of activated carbons. However, the inability of activated carbons to completely reversibly regenerate results in excessive adsorbent consumption. After only a few cycles, the carbon must be disposed of and replaced because it rapidly loses adsorption capacity with each regeneration.

It would be very advantageous if an adsorbent could be identified which removed organic and other hydrocarbon contaminants from the highly polar acid gas stream which constitutes the Claus reactor feed. It would be especially advantageous if this adsorbent could be regenerated and reused through many cycles without substantial loss of adsorption capacity.

Adsorbents may be broken into two broad groups; those with a large quantity of specific, highly charged sites and those with large non-specific uncharged surfaces. Zeolites would represent a prime example of a "specific" adsorbent and carbon and silica would represent prime examples of the "nonspecific" types. Specific site adsorbents may bind species very strongly, allowing for the essentially complete removal of favored trace components from larger streams. The sites in such materials bind with polar or polarizable species by electrostatic interaction. The bulk of Claus gas feed streams consist of highly polar $H_2O$ and $H_2S$ and extremely polarizable $CO_2$. However, the sites in the specific adsorbent materials may be overwhelmed by the polar and polarizable species in such a stream and essentially a reduced number of sites would be available for binding with organics and hydrocarbons. Non-specific adsorbents tend to bind physically larger molecules on their surfaces and thus would be expected to selectively adsorb larger hydrocarbons from the combination of small molecules ($H_2O$, $H_2S$, $CO_2$) which form the bulk of Claus feed streams. However, the weak binding energy inherent to non-specific adsorbents such as carbon substantially limits the adsorption capacity, especially of small hydrocarbons such as propane. Moreover, as discussed above, the non-specific adsorbents do not readily regenerate to the full original adsorbent capacity, and must be replaced after only a few adsorption/ regeneration cycles.

It would be desirable to remove a broad spectrum of hydrocarbons in a Claus feed gas pretreatment system. An appropriate adsorbent would be a material which behaves like a non-specific adsorbent in the sense of favoring larger species such as organic and hydrocarbons while binding these with the high interaction forces and high selectivities associated with specific cited materials.

Importantly, it has been found that regardless of the adsorbent used, there is a level of $H_2S$ which is coadsorbed with the hydrocarbons. Without further processing, the adsorbed $H_2S$ would be present in the desorbed stream upon regeneration of the adsorbent. This desorbed stream cannot be vented to the atmosphere or vented to a fuel system because of the residual $H_2S$ content. Further, coadsorption of $H_2S$ diminishes adsorbent activity for hydrocarbon removal resulting in the need for additional adsorbent requirement and consumption. Accordingly, the coadsorption of $H_2S$ represents an inherent problem in practicing the removal of hydrocarbons from a Claus feed stream using adsorption processing.

SUMMARY OF THE INVENTION

It has now been found that the unique three-dimensional framework of "EXS" molecular sieves, are particularly effective for the removal of organic compounds including hydrocarbons from hydrogen sulfide-containing feed gas streams for Claus reactors. EXS molecular sieves are distinguished from other molecular sieves by possessing octahedrally coordinated active sites in the crystalline structure. These molecular sieves contain electrostatically charged units that are radically different from charged units in conventional tetrahedrally coordinated molecular sieves such as in the classic zeolites. Members of EXS family of sieves include, by way of example, ETS-4 (U.S. Pat. No. 4,938,939), ETS-10 (U.S. Pat. No. 4,853,202) and ETAS-10 (U.S. Pat. No. 5,244,650), all of which are titanium silicates or titanium aluminum silicates. The disclosures of each of the listed patents are incorporated herein by reference. The EXS sieves exhibit isotherms at temperatures slightly above ambient indicating the more active binding of organic species whereas at these temperatures, polar species show only minimal adsorption. As a consequence, organic species such as aliphatic and aromatic hydrocarbons can be selectively adsorbed from polar streams such as the feed gas stream to Claus reactors which contain polar species of $H_2S$, $CO_2$ and water.

Unlike the use of activated carbons, the organic species which have been adsorbed by the molecular sieves used in this invention can be removed by thermal or pressure swing processes reversibly for many cycles without significant loss of adsorption capacity. Accordingly, the present invention is further directed to a specific process of using, regenerating and reusing EXS molecular sieves for adsorbing organic species from hydrogen sulfide-containing or other polar gas streams.

The invention is also directed to a novel integrated process for removing hydrocarbons from a Claus feed stream using adsorption processing. In general, this invention effectively solves the problem of $H_2S$ coadsorption and the consequent process inefficiencies and environmental problems which result. The inherent problem of $H_2S$ coadsorption is solved in this invention by contacting the desorbed stream obtained from regeneration of the adsorbent with a lean acid gas removal solution either as an aqueous amine or physical solvent. The amine solution or solvent separates the residual $H_2S$ from the desorbed hydrocarbons. The newly rich solution containing polar gases can be recycled to natural gas or refinery stream clean-up processing. In this integrated process it has been found that the EXS molecular sieves and high silica aluminosilicate zeolites are useful adsorbents for removing the hydrocarbons from the Claus feed.

DETAILED DESCRIPTION OF THE INVENTION

Figure 1:
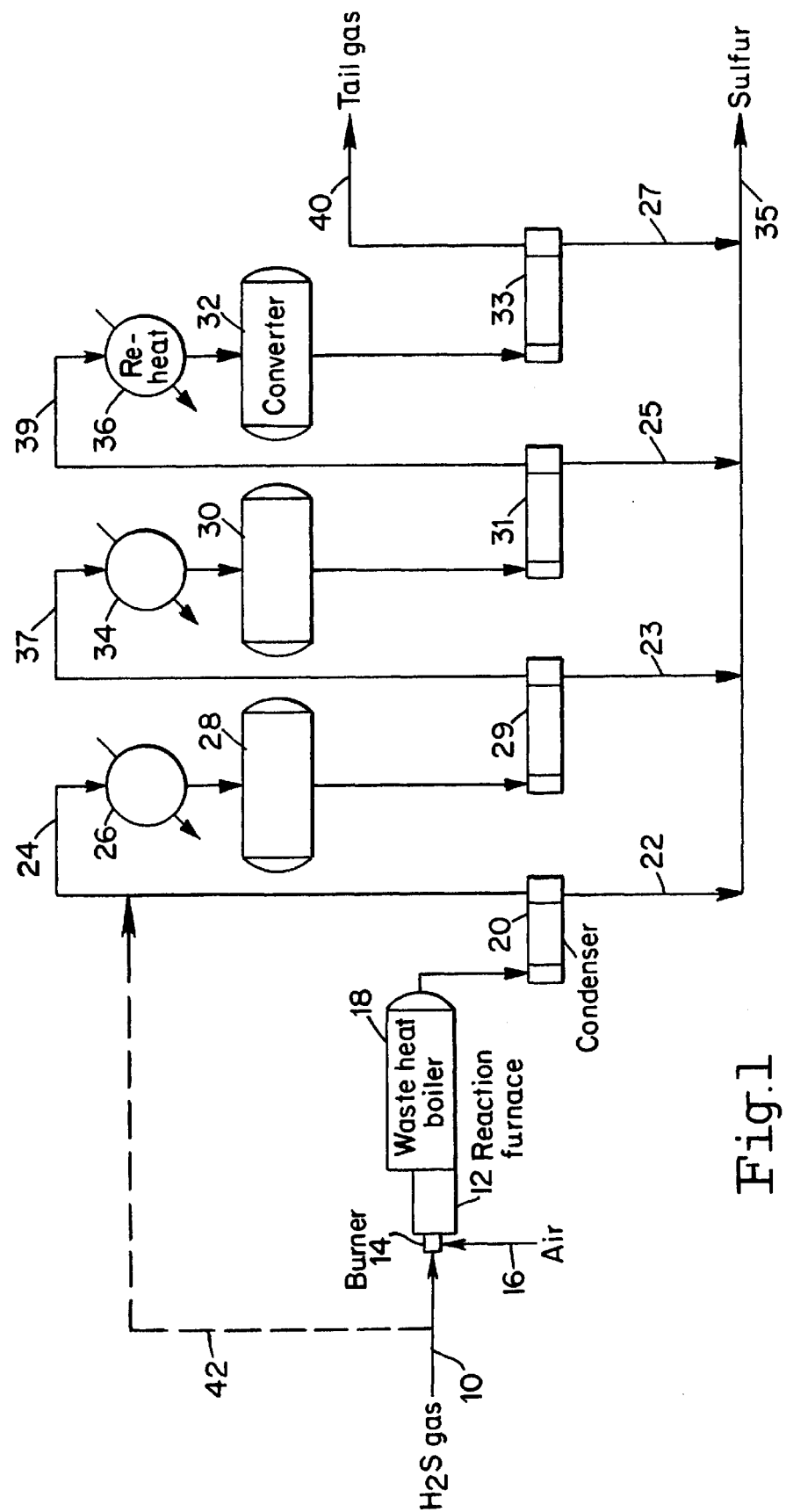
FIG. 1 is a schematic of the Claus process which shows both the straight-through and split-flow processing schemes.

This invention is particularly directed to the treatment of a hydrogen sulfide-containing feed gas stream to a Claus plant. In the process of this invention, the feed gas stream to a Claus plant is treated so as to remove hydrocarbon and other organic contamination therefrom. Hydrogen sulfide-containing streams are advantageously treated in the Claus plant to convert the hydrogen sulfide to sulfur. A schematic of a typical three-stage Claus plant is shown in FIG. 1. The first step of the Claus process involves a controlled combustion of a feed gas which contains hydrogen sulfide and the noncatalytic reaction of unburned hydrogen sulfide with sulfur dioxide as depicted in reactions (1) and (2) above. In the straight through process, a feed gas containing hydrogen sulfide is directed via line 10 to reaction furnace 12 which contains a burner 14 where the feed gas is combusted. Oxygen is supplied to burner 14 by an air stream via line 16. From the reaction furnace 12, the products are cooled in a waste heat boiler 18 and the products condensed and separated in condenser 20 into a liquid sulfur stream 22 and gaseous product stream. Gaseous products are reheated via line 24 in reheater 26 and passed through a series of catalytic reactors 28, 30 and 32 wherein the unreacted hydrogen sulfide and sulfur dioxide react over a catalyst, typically alumina, to produce sulfur and water as depicted in reaction (2). Subsequent to each reaction, the reaction products are condensed in respective condensers 29, 31 and 33 wherein liquid sulfur is separated and removed via respective lines 23, 25 and 27 and joined with liquid sulfur from line 22 to form a final sulfur stream 35. Precedent to the respective catalytic reactions in reactors 30 and 32, the product gas directed from the preceding condensers 29 and 31 is reheated in respective reheaters 34 and 36 which receive the cooled gas stream via lines 37 and 39, respectively. Tail gas leaving condenser 33 via line 40 can be treated in the conventional ways, including burning or further treatment to recover additional sulfur as was previously described and well-known in the art.

An alternative to the straight-through process, is the split-flow process. In this process, 40–60% of the Claus feed bypasses the burner and is fed directly to the first catalytic stage. This process is shown in FIG. 1 wherein line 42 directs a portion of the $H_2S$-containing feed from line 10 into line 24 containing product gas from condenser 20. The mixed stream is heated in reheater 26 and passed to first stage catalytic reactor 28.

The present invention is concerned with treating the $H_2S$-containing feed gas 10 directed either to burner 14 or bypass 42. In addition to the hydrogen sulfide, feed stream 10 contains carbon dioxide and typically about 3 weight percent hydrocarbons, as well as small amounts of water. The heavy aliphatic and aromatic hydrocarbon constituents of this feed stream present particularly serious problems in operating the Claus process. In addition to rapid deactivation of the Claus reactor catalyst, a portion of these organic compounds form toxic species with sulfur. These compounds are subject to additional regulatory control. While burner design has been improved to handle moderately higher concentrations of hydrocarbon impurities, and even higher molecular weight hydrocarbons, the burner design, no matter how intricate or expensive, only addresses coping with the organic impurities and not solving the problem.

In accordance with the present invention, an improved process is provided using adsorbents to remove the organic contaminants from the hydrogen sulfide-containing feed gas stream to a Claus plant. The improved process solves a problem which has adversely affected adsorbent processes in the past, that being the coadsorption of $H_2S$ and the consequent economic inefficiencies and, more importantly, the occurrence of additional environmental problems as discussed previously. The adsorbents useful in this invention need to bind hydrocarbons more strongly than other constituents of the Claus feed gas stream including $H_2S$, $CO_2$, and $H_2O$. Examples of useful adsorbents include high silica zeolites such as zeolite beta, zeolite Y and ZSM-5 and derivatives thereof and, non-polar amorphorous adsorbents including silica and like derivatives. The term "high silica" refers to zeolites having a $SiO_2/Al_2O_3$ mole ratio of at least 4 and, preferably, at least 5. A particularly useful high silica zeolite is HiSiv™ 1000, a zeolite Y from UOP. Particularly useful are the EXS molecular sieves which are constructed from units of octahedral titania chains strung together by tetrahedral silica webs. This construction is radically different from classical molecular sieves such as zeolites and induces radically different adsorption properties. In particular, the EXS molecular sieves demonstrate unusual adsorption properties toward polar species. While substantial adsorption of all species is seen at ambient temperature, modest temperature rises collapse the adsorption isotherms of the polar species. The EXS adsorbents are essentially non-adsorptive toward water at temperatures approaching 100° C. Carbon dioxide demonstrates adsorptive properties on these adsorbents much like water, wherein the adsorption isotherm collapses rapidly at rising temperatures. Hydrogen sulfide, being a polar species, would reasonably be expected to behave like water and carbon dioxide. In fact, the present inventors have shown that indeed, the adsorption properties of the EXS adsorbents behave with respect to hydrogen sulfide similarly to the adsorptive behavior of polar species water and carbon dioxide. Conversely, organic species such as $C_1$–$C_8$ aliphatics and aromatics bind very strongly to the EXS adsorbents. Much higher temperatures are needed to desorb these hydrocarbon species.

In accordance with one aspect of the present invention, a feed stream containing a combination of polar species including $H_2S$, $CO_2$ and water and organics, including hydrocarbons, is passed through an EXS adsorbent at a temperature of approximately 50–100° C. The polar species are eluted with a minium of adsorption while the hydrocarbons and other organics are substantially adsorbed and retained within the EXS adsorbent. Thus, the organic contaminants in a Claus plant feed stream are essentially removed. As a consequence, simplified burner and furnace design can be used, reducing equipment costs. Moreover, downstream tail gas treatment can be drastically reduced since the toxic species which form by the reaction of the organics and the hydrogen sulfide are drastically reduced. Elevating the temperature of the adsorbent after passage of the feed stream, such as to a temperature above 200° C. desorbs the organics and regenerates the adsorbent for the next adsorption cycle at reduced temperatures.

Members of the EXS family of sieves which can be used in the practice of this invention include ETS-4, ETS-10 and ETAS-10, all of which have been described in the art and patented. The respective patent numbers for each adsorbent have been set forth above. The most preferred adsorbent for use in this invention is ETS-10.

ETS-10 is stable to hundreds of degrees above the appropriate desorption temperature and, accordingly, remains useful through repeated adsorption/desorption cycles with minimal loss of adsorption capacity. Active sites on the molecular sieves can be exchanged with various cations as is known in the art including, for example, hydrogen, sodium and calcium cations.

EXS sieves used in the process of this invention may be employed in any useful physical form. This includes fine powders, shaped particles such as fluidizable microspheres, pellets, honeycombs, or in composites supported on substrates.

This invention can be carried out by employing various adsorption/desorption cycles such as thermal swing cycles, pressure swing cycles, as well as the use of another fluid or gas to desorb the organics, or combinations of the above. Regardless of the adsorbent used, it is important to both minimize and recover $H_2S$ which has been coadsorbed along with the organic, including hydrocarbon, constituents of the Claus feed gas.

Figure 3:
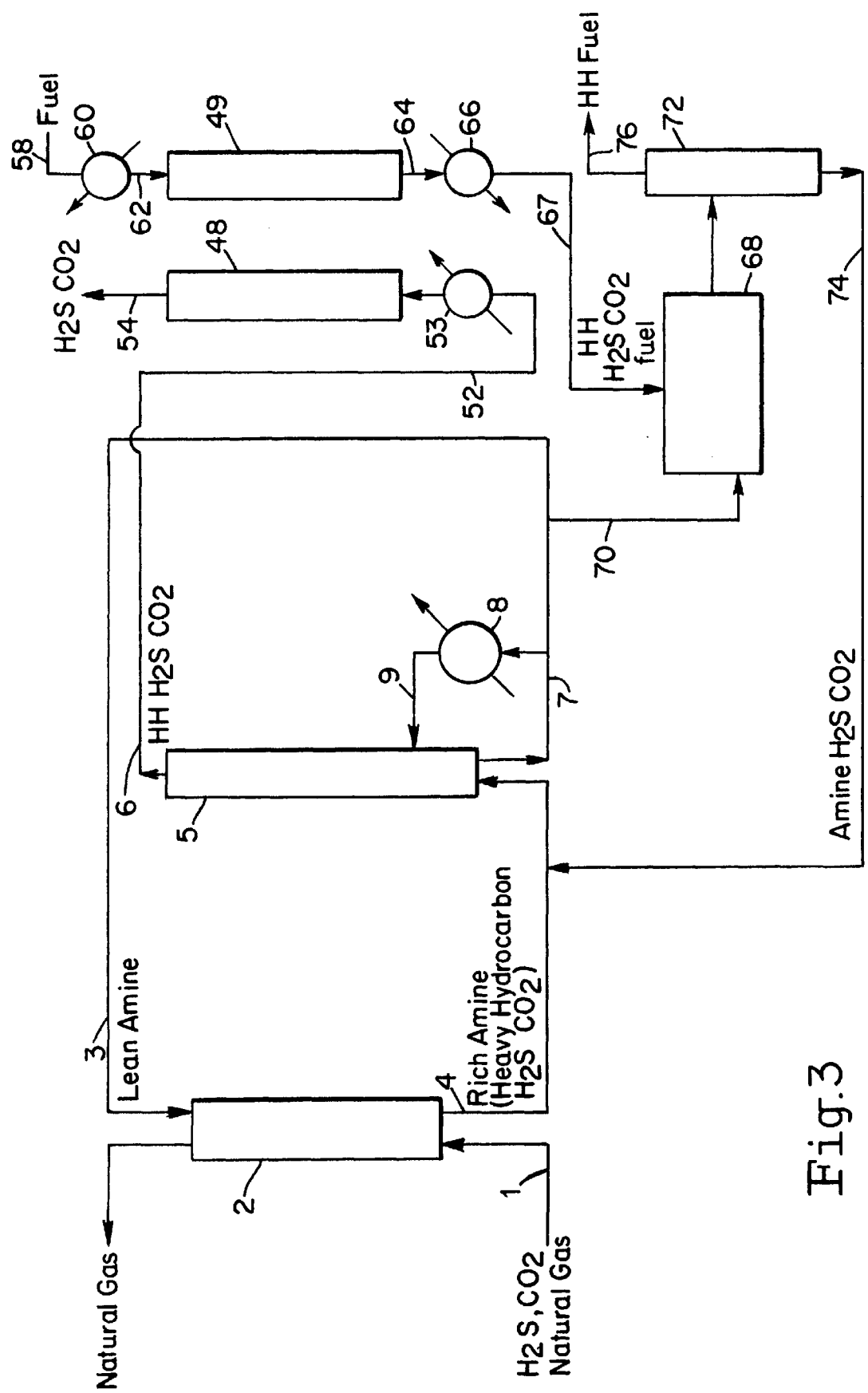
FIG. 3 is a schematic of a processing scheme for adsorbing organic compounds from a hydrogen sulfide-containing Claus feed gas integrated with the process for removal of $H_2S$ from natural gas.

A particular adsorption/desorption cycle is shown in FIG. 3 in which a multiple bed thermal swing adsorption (TSA) unit is utilized along with a purge gas such as methane to remove organics from a Claus plant feed stream and to recover the organic components from the adsorbent. To ensure process efficiencies, it is important that all the hydrogen sulfide that is adsorbed from the feed gas must be recovered and eventually converted to elemental sulfur. The process scheme depicted in FIG. 3 which illustrates an integrated process of natural gas clean-up and contaminant removal from Claus feed streams, achieves this purpose.

In FIG. 3, the process of this invention for removing organics from a Claus feed stream is integrated with a process for removing polar gases from natural gas. It is to be understood that the particular stream from which the hydrogen sulfide Claus feed stream originates is not critical to this invention and can include natural gas and numerous refinery gas streams which contain polar gases such as hydrogen sulfide and carbon dioxide. As shown in FIG. 3, a natural gas 1 containing polar gases such as hydrogen sulfide and carbon dioxide is passed to the bottom of an absorber 2. A lean amine solution from 3 flows down from the top of absorber 2 counter-current to the flow of natural gas 1 in absorber 2 and absorbs from the natural gas stream polar gases such as hydrogen sulfide, carbon dioxide as well as heavy hydrocarbons which leave absorber 2 via 4. Line 4 containing amine solution, the absorbed polar gases and heavy hydrocarbons is now directed to near the top of an amine stripper 5 to separate the amine absorbent from the contaminants which were absorbed from the natural gas stream. In amine stripper 5, the polar gases such as hydrogen sulfide, carbon dioxide and the heavy hydrocarbons are distilled from the amine solution and are removed from the top of amine stripper via line 6. The amine solution which is now essentially free of the absorbed contaminants leaves the bottom of amine stripper 5 via 7 and can be recycled to 3 as a lean amine solution which can now absorb further contaminants from the natural gas stream by counter-current flow in amine absorber 2. The elevated temperature in amine stripper 5 can be maintained by recycling part of the amine solution via 7, reboiler 8 and 9.

Stream 6 containing hydrogen sulfide, carbon-dioxide, and other hydrocarbons including heavy hydrocarbons forms the Claus reactor feed stream. As previously stated, the hydrocarbon contaminants pose a serious environmental problem with respect to converting the hydrogen sulfide to sulphur via the Claus process. In accordance with the present invention, these hydrocarbon contaminants are now removed from the feed stream via adsorption which selectively removes the hydrocarbons from the hydrogen sulfide component. Importantly, the process of the present invention also solves the problem of hydrogen sulfide being co-adsorbed with the hydrocarbons. These two aspects of the process of the present invention can now be described by again referring to FIG. 3.

Referring again to FIG. 3, a multiple thermal swing adsorption (TSA) system containing adsorbers 48 and 49 is described. A third adsorber (not shown) completes the process as will be later described. Alternatively, only two beds can be effectively used, in which case one bed is on adsorption while the other bed is being cooled or heated. Each adsorber contains a bed of an adsorbent. Temperature conditions which follow are particularly useful when using EXS adsorbents. However, the process as described and depicted in FIG. 3 is useful for any of the adsorbents previously disclosed and equivalents thereof. Temperature conditions may vary from the ranges set forth herein if other than EXS adsorbents are used. A process feed, for example, from amine stripper 5 and typically containing 50–60 wt. % $H_2S$, 40–50% $CO_2$, 4% $H_2O$ and 2% hydrocarbons is passed through adsorber 48 so as to remove the hydrocarbon content. In the process of this invention, distilled gas stream 6 becomes feed stream 52 which is heated to a temperature of at least 50° C., and preferably from 60–100° C. in heater 53 and passed to the bottom of the adsorber 48. Alternatively, although not shown in FIG. 3, stream 6 may be cooled to a temperature of about 20° C. to remove water and the stream containing $H_2S$, $CO_2$, hydrocarbons and no more than about 1.5% $H_2O$, then heated to at least 50° C. The adsorption step continues for about 1–5 hours. The product leaving the top of adsorber 48 via line 54 is essentially free of the hydrocarbons and, if lower temperatures within the described range are used, free of water. After the adsorption step is stopped, the adsorber 48 is depressurized co-currently to a pressure of 15 psia. In the depressurization step, the gas leaves the top of the adsorber 48 and no feed gas enters the bottom thereof.

After depressurization of the adsorber, the desorption process can begin. The desorption process is depicted in conjunction with adsorber 49. In the desorption process, a fuel stream such as methane via line 58 passes through a heater 60 which heats the methane to a temperature of at least 150° C., preferably between about 200–375° C. The heated methane via line 62 is used to regenerate the adsorbent bed in adsorber 49 by directing the methane via line 62 through the top of the adsorber 49 at a flow rate similar to the feed flow.rate. Regeneration of the adsorbent bed typically lasts for a period of 1–5 hours. At the conditions of temperature and flow rate, the adsorbed components are desorbed from the adsorbent into the methane purge gas. The methane purge gas stream containing adsorbed hydrocarbons and minor amounts of coadsorbed hydrogen sulfide leave the bottom of adsorber 49 via line 64. This purge stream containing the hydrocarbons and minor amounts of hydrogen sulfide is cooled in condenser 66 to a temperature typically at or below 100° C.

In accordance with this invention, the minor amounts of hydrogen sulfide which have been coadsorbed with the hydrocarbons and now are contained within the hydrocarbon stream desorbed from the adsorbent are recovered. This recovery of the coadsorbed $H_2S$ is believed novel and solves a problem which has reduced process efficiencies as well as exacerbated environmental controls as previously described. Accordingly, after the purge gas stream has been cooled, it is directed via line 67 to an absorption vessel 68 such as a static mixer. In absorption vessel 68, the purge gas stream is mixed and contacted with a lean acid gas removal solution which has been bled from line 7 to remove and separate the $H_2S$ from the purge gas stream. As shown in FIG. 3, the lean acid gas removal solution is directed from stripper 5, via lines 7 and purge line 70 to absorption vessel 68. As shown in the integrated process of FIG. 3, the acid gas removal is achieved with amines which absorb essentially all of the hydrogen sulfide and carbon dioxide and other acid gases from the purge gas stream. It is understood that other acid gas solvents can be used and that the use of amine solutions as herein described and indicated in the drawings include all such materials. Thus, lean acid gas removal solutions include alkanolamine solutions such as methyl diethanolamine, a physical solvent such as sulfolane, Selexol®, N-methylpyrolidone, a mixture of alkanolamine plus a physical solvent such as sulfinol solution, an inorganic solvent such as potassium carbonate, an organic solvent such as propylene carbonate, an organic solvent in combination with an alkanolamine or any other weak organic compounds such as piperazine, or hydroxy ethyl piperazine. The preferred acid gas removal solution is an aqueous alkanolamine solution. The lean amine solution has only a minimum affinity for the desorbed hydrocarbons which are contained in the methane purge gas.

After the transfer of the hydrogen sulfide, carbon dioxide and other acid gases to the lean amine solution in absorption vessel 68 is complete, the purge gas stream along with the protonated acid gas removal solution enter a two- or three-phase separation vessel where the protonated solution is separated from the purge gas via density differences. This is depicted in separation vessel 72. Depending upon the operating conditions of separator 72 and the specific design thereof, the desorbed hydrocarbons could also be condensed and easily separated from the purge gas in this vessel. An optional cooler (not shown) can be placed between the absorption vessel 68 and the separation vessel 72 to enhance separation of the protonated solution from the heavier hydrocarbons and methane purge gas. An additional separator can be used to remove the $C_2$+ hydrocarbons from the methane purge gas. The methane purge gas via 76 can be compressed and recycled back to the thermal swing adsorption unit as the purge gas via 58. The amine solution containing $H_2S$ and $CO_2$ can be recycled from separator 72 via 74 to 4 to strip the acid gases from the amine in stripper 5.

Following regeneration, the adsorbent bed must be repressurized and cooled. Repressurization and cooling of the regenerated adsorbent bed is achieved by withdrawing product from adsorber 48 via 54 and passing the product through a third adsorber (not shown). In the-repressurization step, the gas enters the top of the adsorber and no gas leaves the bottom of the adsorber. In the cooling step, the gas again enters the top of the adsorber and leaves the bottom of the adsorber. Thus, the process of this invention lends itself to a three bed thermal swing adsorption system including continuous adsorption, desorption and repressurization stages.

EXAMPLE 1

Heat of adsorption profiles for EXS sieves with chromatographic analysis may serve as a convenient tool for adsorptive screening. Adsorptive assessment of $CO_2$ on a chromatographic column of desiccant grade ETS-10 indicated a heat of adsorption of approximately 10.5 Kcal/mole. Equivalent testing of propane indicated a heat of adsorption of greater than 12 Kcal/mole. This indicates that propane could, in principle, be selectively adsorbed from a stream of $CO_2$. Propane was chosen as a test adsorbate because it is the smallest hydrocarbon of concern for Claus feed streams. Heats of adsorption for hydrocarbons/organics on ETS-10 rise with molecular size and thus the most difficult to remove by selective adsorption from a Claus gas feed stream would be propane.

In order to assess viability of propane (and by extension, larger hydrocarbons and organics) being stripped from a high $CO_2$ stream, a G.C. was set up with pure carbon dioxide as the carrier gas. With a flow of 20 cc's per minute, CO₂ was passed through a 2½ gram bed (column) of desiccant grade ETS-10. A 5 cc sample of propane was injected at a temperature of 100° C. No elution of propane was observed for a period of ½ hour. At that point, the temperature was raised to 200° C. With this temperature "swing", the propane was rapidly eluted. Clearly, this showed the ability of ETS-10 to selectively adsorb small molecule organics from an acid gas stream.

EXAMPLE 2

Figure 2:
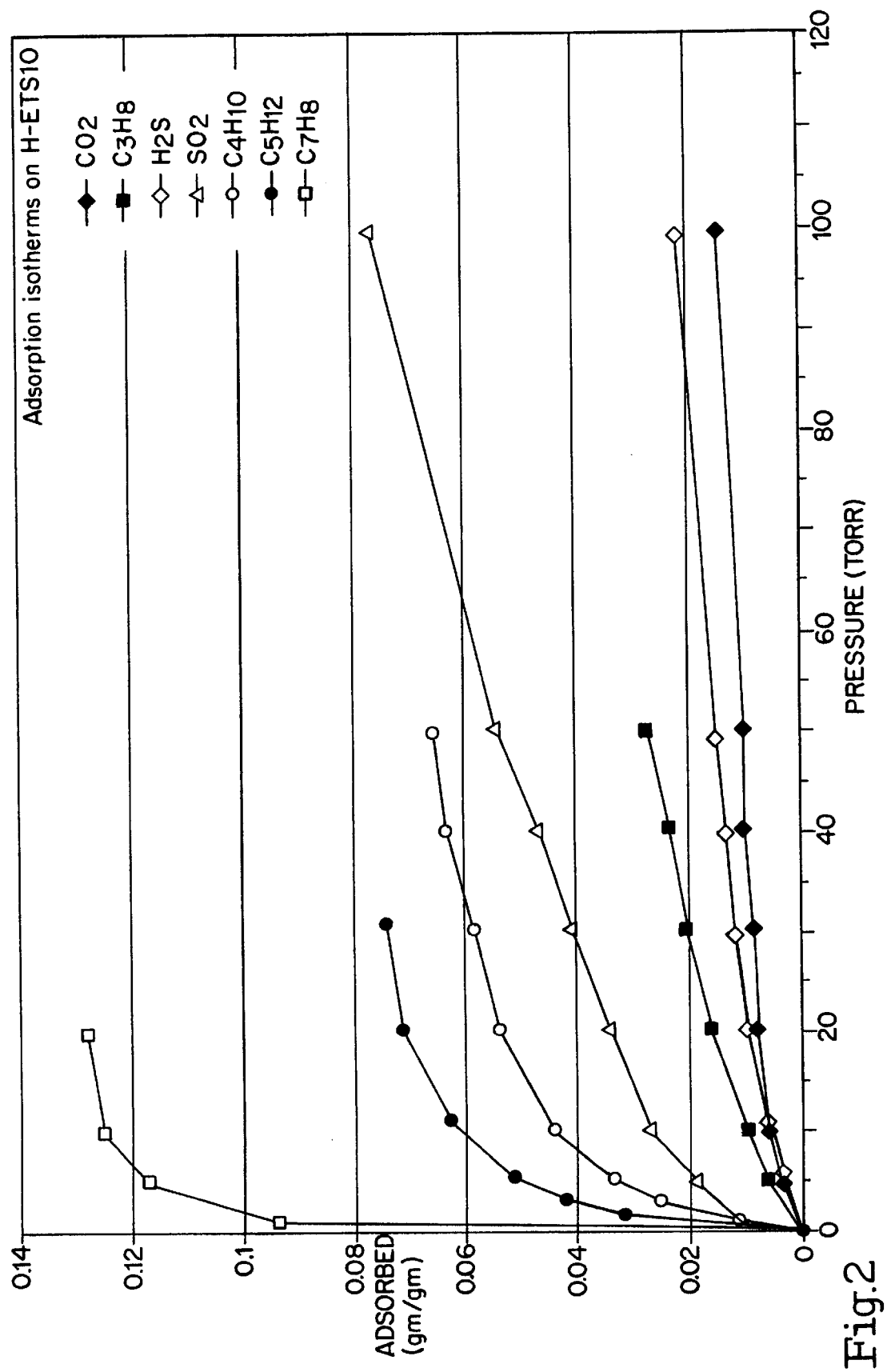
FIG. 2 presents the adsorption isotherms of various compounds on hydrogen exchanged ETS-10 at various pressures.

A sample of partially hydrogen exchanged ETS-10 powder was subjected to a series of single component isotherms at 100° C. The adsorption isotherms are shown in FIG. 2. The isotherms demonstrate a selective adsorption of hydrocarbons relative to $CO_2$, $H_2S$ and $SO_2$. The higher molecular weight hydrocarbons are more readily adsorbed than the lower molecular weight compounds.

EXAMPLE 3

A feed gas for a pilot plant was a synthetic mixture with the following approximate compositions (by mole percent):

| Compound | |
|---|---|
| Methane | 0.1 |
| Ethane | 0.1 |
| Propane | 0.1 |
| Butane | 0.2 |
| Pentane | 0.3 |
| Hexane | 0.35 |
| Benzene | 0.43 |
| Toluene | 0.43 |
| Water | 4.0 |
| Hydrogen Sulfide | 47.0 |
| Carbon Dioxide | 47.0 |

The adsorber contained approximately 19.1 grams of Ca-H-ETS-10 and could be operated at any reasonable temperature and pressure. The flow of feed gas to the adsorber was 110 standard cubic centimeter per minute (SCCM) at a temperature of 60° C. and a pressure of 15.0 pounds per square inch gauge (PSIG). The outlet flow and composition of each component was measured to provide an adsorption time for each component and a complete material balance. The adsorption time for each component was measured at a point in time where no further adsorption of that component was occurring. The adsorption times for each component are as follows:

| Compound | Minutes of Adsorption |
|---|---|
| Carbon Dioxide | 10 |
| Methane | <10 |
| Ethane | 20 |
| Hydrogen Sulfide | 20 |
| Propane | 80 |
| Butane | 300 |
| Pentane | >400 |
| Hexane | >400 |
| Benzene | >400 |

The results indicate that the ETS-10 adsorbent adsorbed and held the hydrocarbon within the adsorbent for times far exceeding those for the acid gases $CO_2$ and $H_2S$. As shown, even propane could be continually adsorbed selectively from the acid gases.

EXAMPLE 4

A feed gas for a pilot plant was a synthetic mixture with the following approximate compositions (by mole %).

| Compound | |
|---|---|
| Methane | 0.1% |
| Ethane | 0.1% |
| Propane | 0.1% |
| Butane | 0.2% |
| Hexane | 0.3% |
| Benzene | 0.43% |
| Toluene | 0.43% |
| Water | 1.3% |
| Hydrogen Sulfide | 48% |
| Carbon Dioxide | 49% |

The adsorber contained 20 grams of Y zeolite (HiSiv™1000) and was operated at a temperature of 60° C. and a pressure of 15 psig. The flow of feed gas to the adsorber was 110 SCCM. The outlet flow and composition of each component was measured to provide an adsorption time for each component. The adsorption time for each component was measured at a point in time corresponding to half its inlet concentration. The adsorption times for each component are as follows:

| COMPOUND | BREAKTHROUGH TIME |
|---|---|
| Methane | Not Measured |
| Ethane | Not Measured |
| Propane | Not Measured |
| Butane | 83 |
| Hexane | 329 |
| Benzene | >500 |
| Toluene | >500 |
| Water | Not Measured |
| Hydrogen Sulfide | 9 |
| Carbon Dioxide | 9 |

The results indicated that the Y zeolite adsorbed the heavier hydrocarbons as well as ETS-10 while holding the $H_2S$ to a lesser extent. However, the butane was not as strongly held. The high silica zeolite Y material would be of value when heavy hydrocarbons (C6+) were the major concern.

EXAMPLE 5

The following process to remove hydrocarbons from a feed gas to a Claus plant depicts the multi-step adsorption process using three adsorption beds as shown in FIG. 3 and described above. A bed of ETS-10 is used as the adsorbent. During the adsorption step the feed gas is fed to the bottom of the adsorber. After three hours the adsorption step is stopped, and the bed is depressurized co-currently to 15 psia in a period of two minutes. After depressurization methane at a temperature of 500° F. is used to regenerate the bed. Regeneration lasts for a period of three hours.

Following regeneration, the bed is repressurized to a pressure of 30 psia with product gas leaving a bed that is undergoing the adsorption step. The repressurization step lasts for a period of two minutes. The repressurized bed is further cooled with product gas leaving a bed that is undergoing the adsorption step for a period of 175 minutes. During the first 1 ½ minutes of the cooling step, the cooling gas is routed through a static mixer and contacted with a lean amine solution. The resulting stream is passed to a three-phase separator. The gas stream leaving the three-phase separator during the first 1 ½ minutes of cooling is routed to the fuel system. For the subsequent 171 minutes of cooling all the gas leaving the adsorption bed is routed to the Claus furnace.

Compositions about the unit for the different steps are given in Table 1. Flow rates and step times are provided in Table 2. In both Table 1 and Table 2, "bot" refers to bottom and "top" refers to top of the bed, respectively. Flow rates and compositions represent the compositions (mol %) entering or leaving the bed. In the adsorption step, gas enters the bottom of the bed and leaves the top of the bed. In the depressurization step, gas leaves the top of the bed and no gas enters the bed. In the heating step, gas enters the top of the bed and leaves the bottom of the bed. In the repressurization step, gas enters the top of the bed and no gas leaves the bed. In the cooling step, gas enters the top of the bed and leaves the bottom of the bed.

TABLE 1

|  |  | Pentane | Butane | $H_2S$ | $CO_2$ | Methane |
|---|---|---|---|---|---|---|
| Adsorb | Top | 0.0001 | 0.0017 | 49.7956 | 50.2022 | 0.0004 |
| Adsorb | Bot | 0.7 | 0.3 | 49 | 49.9999 | 0.0001 |
| Depressurize | Top | 0 | 0.0118 | 50,7393 | 49,2491 | 0.0002 |
| Depressurize | Bot | 0 | 0 | 0 | 0 | 0 |
| Heat 0 to 20 min. | Top | 0.0001 | 0.0001 | 0.0001 | 0.0001 | 99.9996 |
| Heat 0 to 20 min. | Bot | 0.3338 | 0.1338 | 17.9015 | 11.8192 | 69.8117 |
| Heat 20 to 40 min. | Top | 0.0001 | 0.0001 | 0.0001 | 0.0001 | 99.9996 |
| Heat 20 to 40 min. | Bot | 0.155 | 0.0533 | 5.5814 | 0.3776 | 93.8327 |
| Heat 40 to 60 min. | Top | 0.0001 | 0.0001 | 0.0001 | 0.0001 | 99.9996 |
| Heat 40 to 60 min. | Bot | 0.1022 | 0.0304 | 2.8151 | 0.0024 | 97.0499 |
| Heat 60 to 80 min. | Top | 0.0001 | 0.0001 | 0.0001 | 0.0001 | 99.9996 |
| Heat 60 to 80 min. | Bot | 0.0706 | 0.0185 | 1.3313 | 0.0002 | 98.5793 |
| Heat 80 to 100 min. | Top | 0.0001 | 0.0001 | 0.0001 | 0.0001 | 99.9996 |
| Heat 80 to 100 min. | Bot | 0.3105 | 0.6109 | 0.2063 | 0.0001 | 98.8721 |
| Heat 100 to 120 min. | Top | 0.0001 | 0.0001 | 0.0001 | 0.0001 | 99.9996 |
| Heat 100 to 120 min. | Bot | 1.301 | 2.1762 | 0.0001 | 0.0001 | 96.5225 |
| Heat 120 to 140 min. | Top | 0.0001 | 0.0001 | 0.0001 | 0.0001 | 99.9996 |
| Heat 120 to 140 min. | Bot | 3.2841 | 0.0007 | 0.0001 | 0.0001 | 96.7149 |
| Heat 140 to 160 min. | Top | 0.0001 | 0.0001 | 0.0001 | 0.0001 | 99.9996 |
| Heat 140 to 160 min. | Bot | 1.5256 | 0.0001 | 0.0001 | 0.0001 | 98.4741 |
| Heat 160 to 180 min. | Top | 0.0001 | 0.0001 | 0.0001 | 0.0001 | 99.9996 |
| Heat 160 to 180 min. | Bot | 0.0004 | 0.0001 | 0.0001 | 0.0001 | 99.9993 |
| Repressurize | Top | 0 | 0 | 50 | 50 | 0 |
| Repressurize | Bot | 0 | 0 | 0 | 0 | 0 |
| Cool 0–1.5 min | Top | 0 | 0 | 50 | 50 | 0 |
| Cool 0–1.5 min | Bot | 0.0004 | 0.0003 | 0.0049 | 26.9787 | 73.0156 |
| Cool 1.5–174.5 min. | Top | 0.0001 | 0.0017 | 49.7956 | 50.2022 | 0.0004 |
| Cool 1.5–174.5 min. | Bot | 0 | 0.0001 | 48.5824 | 51.4171 | 0.0004 |

TABLE 2

|  |  | Flow (MMSCFD) | Time (min.) |
|---|---|---|---|
| Adsorb | Top | 7.76 | 180 |
| Adsorb | Bot | 7.70 |  |
| Depressurize | Top | 4.24 | 2 |
| Depressurize | Bot | 0.00 |  |
| Heat 0 to 20 min. | Top | 6.54 | 20 |
| Heat 0 to 20 min. | Bot | 8.82 |  |
| Heat 20 to 40 min. | Top | 6.54 | 20 |
| Heat 20 to 40 min. | Bot | 7.01 |  |
| Heat 40 to 60 min. | Top | 6.54 | 20 |
| Heat 40 to 60 min. | Bot | 6.84 |  |
| Heat 60 to 80 min. | Top | 6.54 | 20 |
| Heat 60 to 30 min. | Bot | 6.76 |  |
| Heat 80 to 100 min. | Top | 6.54 | 20 |
| Heat 80 to 100 min. | Bot | 6.70 |  |
| Heat 100 to 120 min. | Top | 6.54 | 20 |
| Heat 100 to 120 min. | Bot | 6.79 |  |
| Heat 120 to 140 min. | Top | 6.54 | 20 |
| Heat 120 to 140 min. | Bot | 6.77 |  |
| Heat 140 to 160 min. | Top | 6.54 | 20 |
| Heat 140 to 160 min. | Bot | 6.65 |  |
| Heat 160 to 180 min. | Top | 6.54 | 20 |
| Heat 160 to 180 min. | Bot | 6.55 |  |
| Repressurize | Top | 5.43 | 2 |
| Repressurize | Bot | 0.00 |  |
| Cool $H_2S$ $CO_2$ | Top | 7.32 | 1.5 |
| Cool $H_2S$ $CO_2$ | Bot | 0.97 |  |
| Cool $H_2S$ $CO_2$ | Top | 7.17 | 174.5 |
| Cool $H_2S$ $CO_2$ | Bot | 7.56 |  |

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. In a method of feeding a hydrogen sulfide-containing feed stream to a Claus process and converting the hydrogen-sulfide to elemental sulfur wherein the feed stream to the Claus process comprises hydrogen sulfide and minor amounts of hydrocarbons and other organic contaminants, the improvement which comprises:

passing said feed stream in contact with an adsorbent which selectively removes at least a portion of said minor amounts of hydrocarbons and other organics from said feed stream, subsequently treating said adsorbent to provide desorption of a hydrocarbon-containing stream from said adsorbent, said hydrocarbon-containing stream containing minor amounts of hydrogen-sulfide which have been co-adsorbed from said feed stream, contacting said hydrocarbon-containing stream with a lean acid gas removal solution stream to remove at least a portion of the minor amounts of hydrogen sulfide which are contained within said hydrocarbon-containing stream, and passing said feed stream subsequent to contact with said adsorbent and having reduced hydrocarbons and other organics to the Claus process.

2. The method of claim 1, wherein said lean acid gas removal solution comprises one or more amines.

3. The method of claim 1, wherein said adsorbent is treated to provide desorption of said hydrocarbon-containing stream by raising the temperature of said adsorbent.

4. The method of claim 3, wherein said adsorbent is treated to provide desorption of said hydrocarbon-containing stream by further passing a hydrocarbon purge stream through said adsorbent.

5. The method of claim 1 wherein said hydrogen sulfide-containing feed stream is obtained by contacting a process gas stream with an acid gas removal solution which removes from said process gas stream, hydrogen sulfide and minor amounts of hydrocarbons and other organic contaminants to form an initial mixture, separating said initial mixture into said hydrogen sulfide-containing feed stream and said lean acid gas removal solution stream which contains reduced levels of hydrogen sulfide relative to said initial mixture.

6. The method of claim 5, wherein said acid gas removal solution is an amine solution.

7. The method of claim 5, wherein subsequent to contacting said hydrocarbon-containing stream with said lean acid gas removal solution stream, the hydrocarbon-containing stream is separated into a hydrocarbon stream and a rich gas removal solution which contains hydrogen-sulfide.

8. The method of claim 7, wherein said rich gas removal solution is combined with said initial mixture of hydrogen sulfide and minor amounts of hydrocarbon and other organic contaminants.

9. The method of claim 5 wherein said process gas stream is natural gas.

10. The process of claim 5, wherein said process gas stream is from a refinery process.

\* \* \* \* \*